United States Patent Office 2,934,235
Patented Apr. 26, 1960

2,934,235

CONTAINERS

Remo R. Maneri, Midland, Mich., assignor to Dow Corning Corporation, Midland, Mich., a corporation of Michigan No Drawing. Application August 18, 1958
Serial No. 755,386

1 Claim. (Cl. 220—64)

This invention relates to metal containers coated with siloxanes.

It is known that organopolysiloxanes, particularly the methylpolysiloxanes, form excellent release agents when applied to the molds for molding plastic articles and for use on paper and equivalent materials to cause the release of adhesive materials. However, there is one area in which the release properties of organopolysiloxanes has not been known in spite of a long felt need. That is the use of organosilicon materials to prevent or to lessen the adhesion of solid materials which deposit from a liquid onto the inside surfaces of containers. This problem has long plagued the transportation and allied industries and manifests itself in many ways.

For example, tank cars containing rubber latices in emulsion form are shipped filled from the producer to the consumer. The car is emptied by the consumer and returned to the producer for refilling. By the time the car reaches the producer the emulsion which remains on the walls of the tank after draining has dried and leaves a solid deposit of the latex inside the tank car. It is essential that this solid deposit be removed else it will contaminate the next batch of latex and render it unsuitable for commercial use. However, it has been found that attempts to remove this deposit from tank cars require an extensive amount of labor and also generally damage the corrosion resistant organic resin coating (usually phenolic) on the inside of the tank car. When this coating is damaged the bare metal is then corroded by subsequent batches of the latex thereby discoloring the paint. Thus, the coating must be replaced. This is often needed after the first cleaning thereby greatly increasing the cost of the organic coating.

A second typical problem occurs in those cases where crude oil containing a high proportion of paraffin is pumped through pipes. Under these conditions the paraffin precipitates from the oil and deposits on the inside of the pipe. This troublesome problem is rendered acute when the oil is pumped from offshore wells where the cooling of the pipes by the water causes a rapid buildup of the paraffin on the inside so much so that often flow is reduced by ⅔ within a period of 24 hours. At this point it is necessary to ream out the entire length of the pipe in order to restore the proper flow. This operation is costly especially since in many cases the well is 20 or more miles offshore.

A third type of problem arises in the storage of solutions and hydroscopic solids in the holds of ships. When the solution contains a solid which precipitates out on the walls of the hold it is often very difficult to remove the solid. This is also true in the case of hydroscopic solids such as sugar. In many cases the hydroscopic solids will pick up enough moisture to liquefy and then reprecipitate against the sides of the hold where it adheres tenaciously and is quite difficult to remove.

It is the object of this invention to provide a metal container which will avoid or substantially reduce the acuteness of the problem of adhering solids such as those described above. Another object is to substantially reduce the cost of handling many commercial materials. Other objects and advantages will be apparent from the following description.

This invention relates to an article of manufacture comprising a metal container coated on the inside with a cured rubbery film of a dimethylpolysiloxane gum whereby solid deposits of organic materials which deposit from a liquid medium on the inside surfaces of said container, are easily removed therefrom.

This invention applies to all types of metal containers such as tanks, the holds of ships, cans, drums and pipe. The inside of the container can be coated in any desirable manner such as by brushing, spraying, or flooding. The siloxane can be applied directly to the bare metal or over an organic resin coating. After application of the siloxane the film is then cured by any desirable process such as by heat alone or by incorporating a curing catalyst such as an organic peroxide and then heating or by subjection to electromagnetic or electron radiation or combinations thereof. The preferred method of curing is that of employing a combination of siloxane gum, a metallic catalyst and silicate or $$-\underset{|}{\overset{|}{\text{Si}}}\text{H}$$

compound or by employing an acyloxysiloxane as described below. These curing systems give the best coatings.

It is essential for the purposes of this invention that the siloxane film on the inside of the container be cured and that the siloxane coating be in the form of a rubbery, tough material. This type of coating is obtained by curing a polysiloxane having a viscosity of at least 1,000,000 cs. at 25° C. Operative siloxanes include the polydimethylsiloxane homopolymers and copolymers thereof with limited amounts (that is less than 20 mol percent) of other siloxanes such as phenylmethylsiloxane, diphenylsiloxane and the like. These siloxanes are generically referred to herein as dimethylpolysiloxane gums.

If desired, the dimethylpolysiloxane gum can be modified by incorporating therein minor amounts of low molecular weight hydroxylated dimethylsiloxanes or methylsiloxane resins such as copolymers of monomethyl- and dimethylsiloxane, copolymers of trimethylsiloxane and $SiO_2$ and copolymers of monomethyl- and trimethylsiloxanes. The incorporation of these resinous materials often gives a tougher film. In all cases, the proportions of resins or fluid siloxanes employed should be minor so as to not cause the film to become non-rubbery or to substantially reduce the strength of the rubbery coating. The latter is particularly effected by the presence of a major amount of low molecular weight fluids (i.e. fluids of less than 1,000,000 cs.).

If desired, the polysiloxane may contain fillers such as silica, titania, carbon black and other well-known fillers for organosilicon rubbers. It is preferable, however, that the amount of filler employed be less than 20 parts per 100 parts of polysiloxane.

Specific examples of curing systems which are operative in this invention are mixtures of dimethylpolysiloxane gums with alkyl silicates such as ethylorthosilicate, propylorthosilicate, allylorthosilicate, methylcellosolveorthosilicate, and partial hydrolyzates of said silicates which are commercially known as polysilicates. The curing of the system is brought about by mixing the gum and the silicate together with a suitable curing catalyst such as carboxylic acid salts of metals ranging from lead to managanese in the electromotive series of metals or amines such as condensation products of formaldehyde and ammonia, diamylamine and hexylamine.

Alternatively, the curing system can be composed of the dimethylpolysiloxane gum and an SiH containing siloxane. Preferably the SiH containing siloxane is a methylhydrogensiloxane. When this combination is employed, the preferred curing catalysts are any of the carboxylic acid salts shown above.

A third specific type of curing system which is operative herein is methylpolysiloxane gums having polyfunctional acyloxy silicon units substituted therein. These materials may be represented by the general formula $$(AcO)_2Si[OSi\overset{Me_2}{}]_nOSi(OAc)_2$$

in which R is a monovalent hydrocarbon radical and Ac represents an acyl group of an aliphatic carboxylic acid such as formic, acetic, propionic, acrylic, butyric and the like. These materials cure spontaneously upon exposure to the atmosphere to give rubbery coatings. The acyloxy endblocked siloxanes are best prepared by reacting the corresponding hydroxyl endblocked siloxanes i.e.

$$H[O\overset{Me_2}{Si}]_nOH$$

with a monoorganoacyloxysilane of the formula $$RSi(OAc)_3$$

Reaction takes place spontaneously upon mixing the siloxane and the acyloxy silane and should be carried out in the substantial absence of water.

The following examples are illustrative only and should not be construed as limiting the invention which is properly delineated in the appended claim. The term "parts" as employed herein refers to parts by weight.

*Example 1*

A solution of a dimethylpolysiloxane gum was prepared by mixing 66.6 parts of a 30% by weight xylene solution of a mixture of 97 parts of a dimethylpolysiloxane gum, 3 parts of a fluid methylhydrogenpolysiloxane, and 1 part fume silica; 3.6 parts ethylpolysilicate; 29.8 parts mineral spirits; and 1 part dibutyltindioctoate. The solution was applied to the inside of a 5 gallon steel container and allowed to dry at room temperature for 24 hours. A commercial butadiene-styrene latex emulsion was placed in the container. The container was then emptied and the latex emulsion adhering to the walls thereof was allowed to dry. The dried latex was easily removed from the walls of the container by rinsing with water.

When the latex was placed in a container which contained no silicone coating and thereafter removed and the adhering film allowed to dry it was necessary to chip away the adhering latex with a metal instrument.

When the above formulation is employed to coat the inside of the tank car and allowed to cure for 24 hours and the car is then filled with a commercial butadiene-styrene latex emulsion and then emptied and the adhering emulsion film allowed to dry, the resulting dried latex can be removed from the inner surface of the tank car by washing with water.

*Example 2*

When the siloxane composition of Example 1 is coated on the inside of pipe and crude oil containing dissolved paraffin is pumped through the pipe the buildup of paraffin on the inner surface of the pipe is greatly reduced.

*Example 3*

Equivalent results are obtained when the following siloxane compositions are coated on the inside of a tank car, cured as indicated and the car is employed as shown in Example 1:

| Siloxane | Cure |
|---|---|
| (1) 45 parts of a 30% by weight toluene solution of dimethylpolysiloxane gum, 3 parts ethylpolysilicate, 13.1 parts of a 1,000 cs. hydroxylated dimethylpolysiloxane fluid, 1.9 parts zinc octoate and 38.5 parts mineral spirits. | 3 hrs. at 100° C. |
| (2) A 30% by weight xylene solution of 97 parts of a dimethylpolysiloxane gum, 3 parts of methylhydrogenpolysiloxane fluid and 3 parts of dibutyltindioctoate. | Room temperature. |
| (3) A 50% by weight toluene solution of an acetoxy endblocked dimethylpolysiloxane gum of the general formula. $(CH_3COO)_2SiO[SiO]_nSi(OOCCH_3)_2$ | Air dried. |

*Example 4*

Equivalent release is obtained when the hold of a ship is coated with any of the compositions of Examples 1 and 3 and sugar is stored in the coated hold.

That which is claimed is:

The method comprising placing a liquid having dispersed therein a solid having a tendency to deposit, in a metal container, which container is coated on the inside with a cured rubbery film of a dimethylpolysiloxane gum whereby any solid deposited from the liquid onto the inner surface of the container is easily removed therefrom.

References Cited in the file of this patent

UNITED STATES PATENTS

| 2,462,242 | Webb et al. | Feb. 22, 1949 |
| 2,606,510 | Collings | Aug. 12, 1952 |
| 2,672,104 | Clark | Mar. 16, 1954 |